United States Patent [19]

Leroy et al.

[11] 4,106,758

[45] Aug. 15, 1978

[54] CONVERTERS FOR REFINING METALS

[75] Inventors: Pierre Leroy, Saint-Germain-en-Laye; André Maubon; Jean Saleil, both of Saint-Etienne, all of France

[73] Assignee: Creusot-Loire Enterprises, Paris, France

[21] Appl. No.: 805,606

[22] Filed: Jun. 10, 1977

[30] Foreign Application Priority Data

Jun. 16, 1976 [FR] France ............................ 76 18252

[51] Int. Cl.² .................................................. C21C 5/38
[52] U.S. Cl. ...................................... 266/158; 266/245; 266/225
[58] Field of Search ................ 75/60; 266/142, 143, 266/158, 218, 220–226, 243–248; 13/10

[56] References Cited

U.S. PATENT DOCUMENTS

| 805,834 | 11/1905 | Baggaley | 266/223 |
|---|---|---|---|
| 1,140,550 | 5/1915 | Weissenburger | 75/60 |
| 1,297,149 | 3/1919 | Greene | 13/10 |
| 1,427,436 | 8/1922 | Bradley | 13/10 |
| 1,469,817 | 10/1923 | Rennerfelt | 13/10 |
| 3,013,789 | 12/1961 | Sayre et al. | 266/158 |
| 3,425,676 | 2/1969 | Shekels | 266/225 |
| 3,533,611 | 10/1970 | Boyer et al. | 266/99 |
| 3,905,589 | 9/1975 | Schempp et al. | 266/224 |

FOREIGN PATENT DOCUMENTS

| 148,388 | 9/1921 | United Kingdom | 266/158 |
|---|---|---|---|
| 507,936 | 6/1939 | United Kingdom | 266/244 |
| 548,737 | 10/1942 | United Kingdom | 13/10 |

OTHER PUBLICATIONS

Publication: Metal Progress; vol. 71, No. 1, Jan. 1957; pp. 67–72.

*Primary Examiner*—Gerald A. Dost
*Attorney, Agent, or Firm*—Haseltine, Lake & Waters

[57] ABSTRACT

A converter for the refinement of liquid metal comprising a generally cylindrical body having closed ends and an opening in the circumference thereof, the body being arranged with its axis horizontal and being rotatable thereabout, a refractory arch with a heating unit movable into one part of the opening in the "normal" position of the body in which the opening is in an upper part thereof, a gas collection system aligned with the other part of the opening in the "normal" position of the body, and blast pipes extending into the body through a lower part of the body in the "normal" position thereof.

16 Claims, 5 Drawing Figures

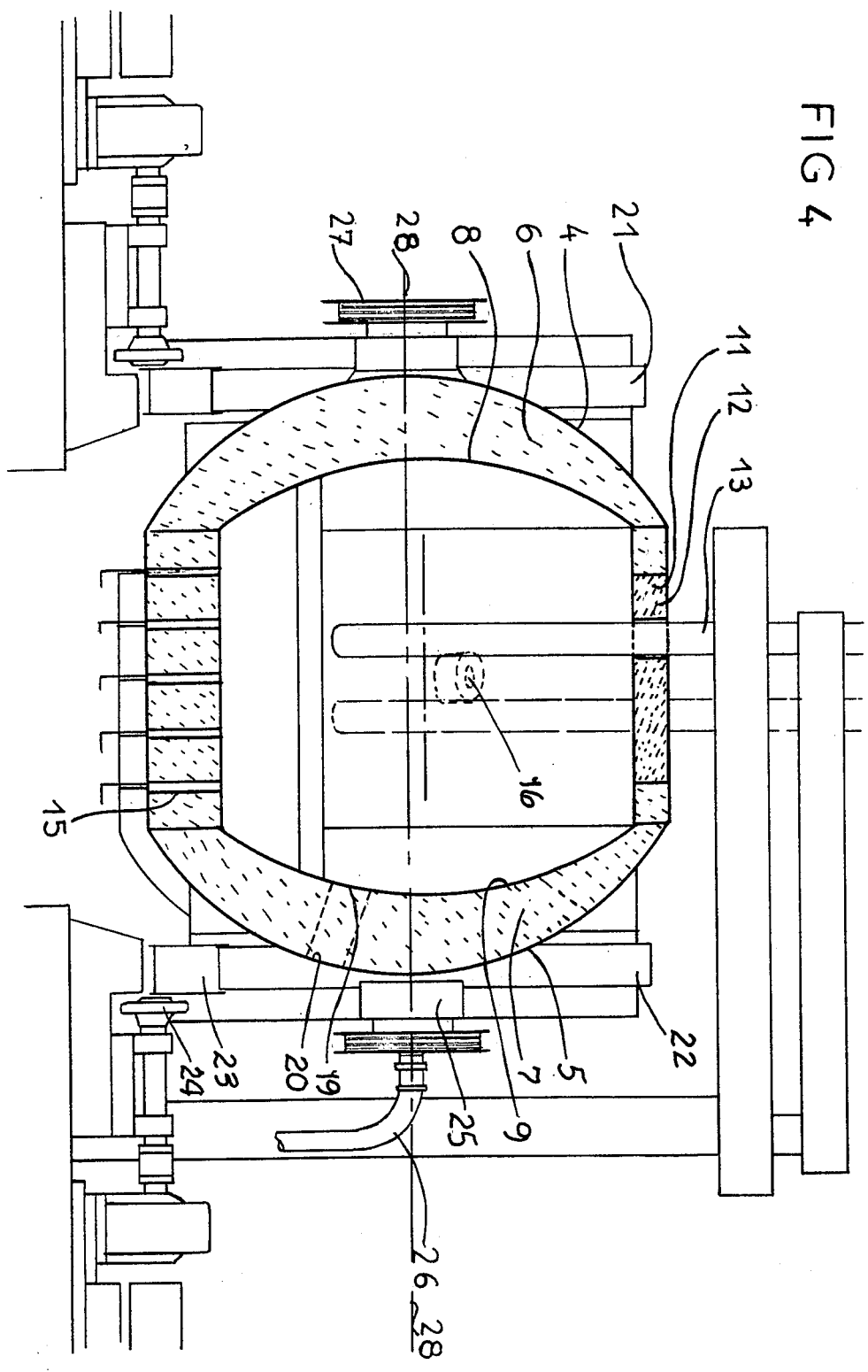

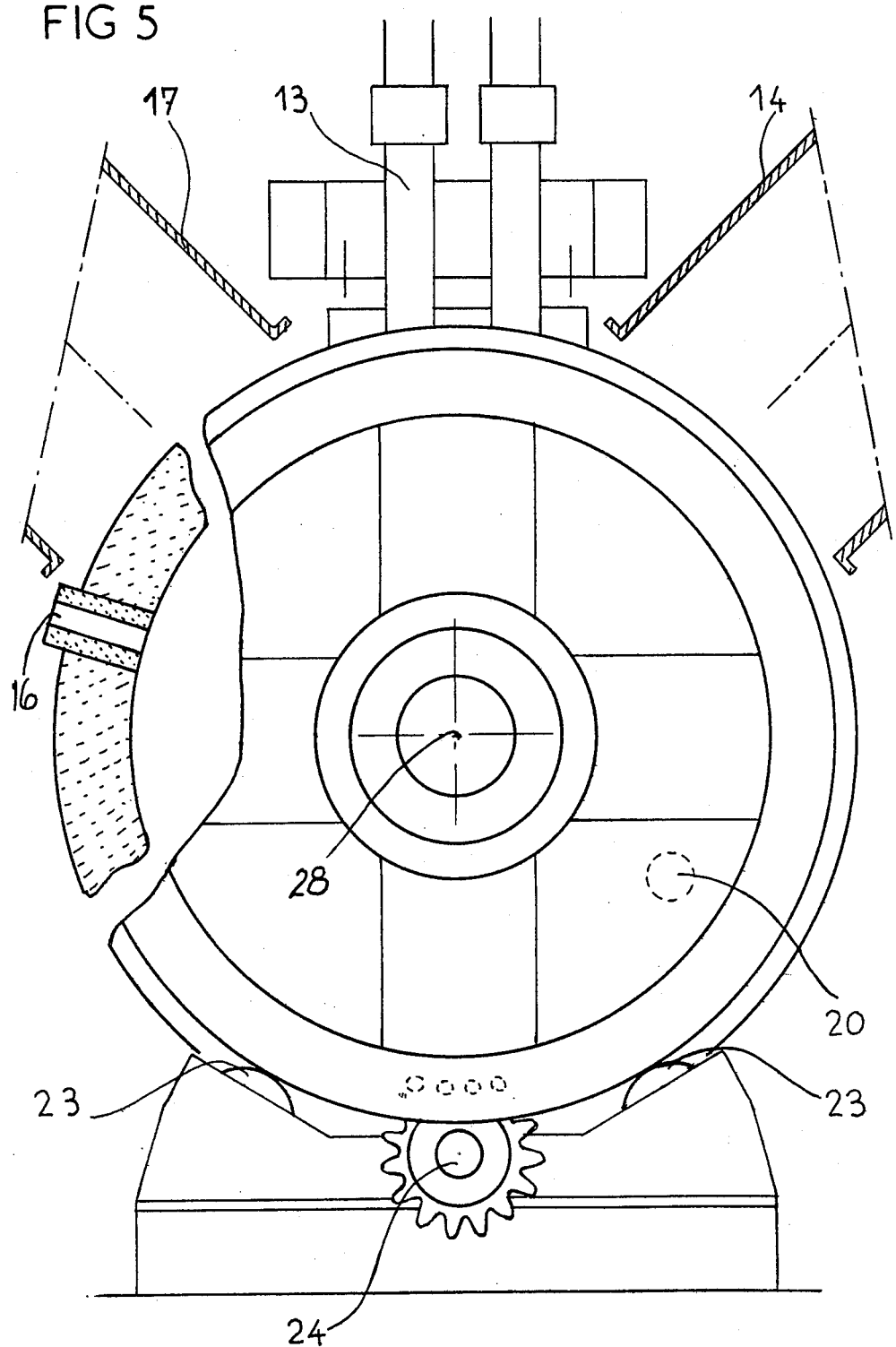

CONVERTERS FOR REFINING METALS

FIELD OF THE INVENTION

The present invention relates to improvements in converters for refining metals in the liquid state.

PRIOR ART

Hitherto converters employed industrially for refining metals in the liquid state do not include means for heating during the course of refinement. Designs of tilting converters equipped with electrodes as described in certain old patents have never been developed industrially.

On the other hand, furnaces for melting and refinement such, for example, as Martin furnaces and electric arc furnaces, in the case of equipment working produce steel, have sometimes attempted to add means of refinement, such as lances or blastpipes, to their heating means. But in doing this, the melting and refining furnaces have preserved all their structural characteristics. Hence, they have encountered considerable difficulty in the adoption of powerful blast means which enable blast times to be achieved which are as short as those of converters.

SUMMARY OF THE INVENTION

According to the present invention, there is provided a converter for the refinement of liquid metal comprising a generally cylindrical hollow body having a horizontal axis and opening means in the circumference thereof including first and second circumferentially spaced parts, end members closing the ends of said body, means for supporting and rotating said body about its axis, a refractory arch including heating means and movable into said first part of said opening means when said opening means is in the upper part of said body, said heating means then extending into said body, means for collection of gases from said body, said gas collection means being separate from said body and mounted to be aligned with said second part of said opening means to receive gases therethrough when said first part of said opening means is positioned to receive said arch and heating means, and blast pipe means extending through and into said body, said blast pipe means being arranged in a lower part of said body when said opening means is in an upper part of said body.

The body and end members may be made of sheet steel internally lined with refractory material and the end members may be outwardly domed or generally planar.

The opening means may be provided by a single opening or by two openings which are adjacent but angularly spaced, each opening providing one of the parts of said opening means.

The heating means is preferably one of three three-phase electrodes, a fuel-oil burner and a plasma torch.

The blastpipe means preferably includes a plurality of blastpipes each provided with means for admission of a peripheral protective agent for protection against wear during the course of blowing in.

Second means may be provided for collection of gases from the body, the second means being separate from the converter and said first and second gas collection means being arranged symmetrically with respect to said arch such that on rotation of said body to position said arch in said second part of said opening, said second gas collection means is aligned with said first part of said opening, said blastpipe means being then arranged in an emerged position above or at the surface of the bath of metal in the converter body.

Advantageously, the ratio between the overall length of the body of the converter and its diameter lies between 0.8 and 1.8 and preferably between 1 and 1.3.

The converter may be supported on two circular cradles rolling on rollers and upon which it can be rotated about its horizontal axis of rotation by any known means, for example, in the manner of a steelworks mixer.

Alternatively, the sheet steel is attached rigidly to a metal belt which extends horizontally around the converter body in the normal operative position of the converter, the belt being fixed to the sheet steel and to two trunnions arranged on the horizontal axis of rotation of the converter opposite one another and resting upon two bearings so that the converter can tilt with its belt and its trunnions in the manner of a steelworks converter.

The blastpipes may be arranged in a removable refractory block extending along an elongated circular sector of the body, for example, as in traditional converters with removable bottoms.

The converter may be provided with a taphole arranged in a quadrant of the circumference of the body extending from an outer edge of said first part of said opening means and away from said opening means.

Raking off of slag may be carried out by rotation of the converter so that the slag overflows the sill at that edge of the opening means opposite the taphole, the blastpipes being then submerged and blowing in a sweeping blast at low flow.

Alternatively, the converter may have a special aperture for raking off slag, arranged in one of its two end members. The aperture may be equipped externally with a profiled slagging channel. The position of the aperture and the profile of the channel are such that, taking into account the variable volume and the variable level of the slag, a small rotation of the converter body will be sufficient to avoid or to carry out, at small or large flow, raking off of the slag.

In one embodiment of the invention, the circumference of the body of the converter includes six unequal angular sectors which in the normal operative position for simultaneous heating, melting and refinement are as follows:

a first sector, subtending an angle at the center of 45° and with a vertical upwardly directed bisector including the first part of the opening and receiving the heating means and the movable refractory arch;

adjacent to said first sector, a second sector subtending an angle at the center of 45°, including the second part of the opening and being surmounted in the "normal" operative position by the first gas collection means;

adjacent to the second sector, a third sector subtending an angle at the center of 83° and including solely refractory lining without any opening;

adjacent to the third sector, a fourth sector subtending an angle at the center of 20° and including the blastpipes which extend along the major portion of the length of the converter;

adjacent to the fourth sector, a fifth sector subtending an angle at the center of 113° and including solely refractory lining without any opening;

finally, between the fifth sector and the first sector, a sixth sector subtending an angle at the center of 54°, including a refractory lining equipped with a taphole arranged immediately adjacent the fifth sector, this sixth sector being surmounted outside the zone of the taphole by second means for collection of gases which is unused in the "normal" operative position, but usable if the converter turns through 45° in the appropriate direction so that it can be operated solely with its heating means, the blastpipes then lying at or above the level of the bath of metal and not being used.

In accordance with another characteristic of the invention, a charging device for solid matter may be arranged above the refractory arch enabling the introduction of solid matter to be carried out through an aperture provided in the said arch for this purpose.

The invention will be more fully understood from the following description of an embodiment thereof, given by way of example only, with reference to the accompanying drawings.

BRIEF DESCRIPTION OF THE DRAWINGS

In the drawings:

FIG. 4 is a longitudinal section through the converter of FIG. 1 taken through a plane of symmetry passing through its horizontal axis of rotation and through a row of blastpipes; and FIG. 5 is an end view of a domed end member of the converter, the latter being in the "normal" position.

DETAILED DESCRIPTION

Figure 1:
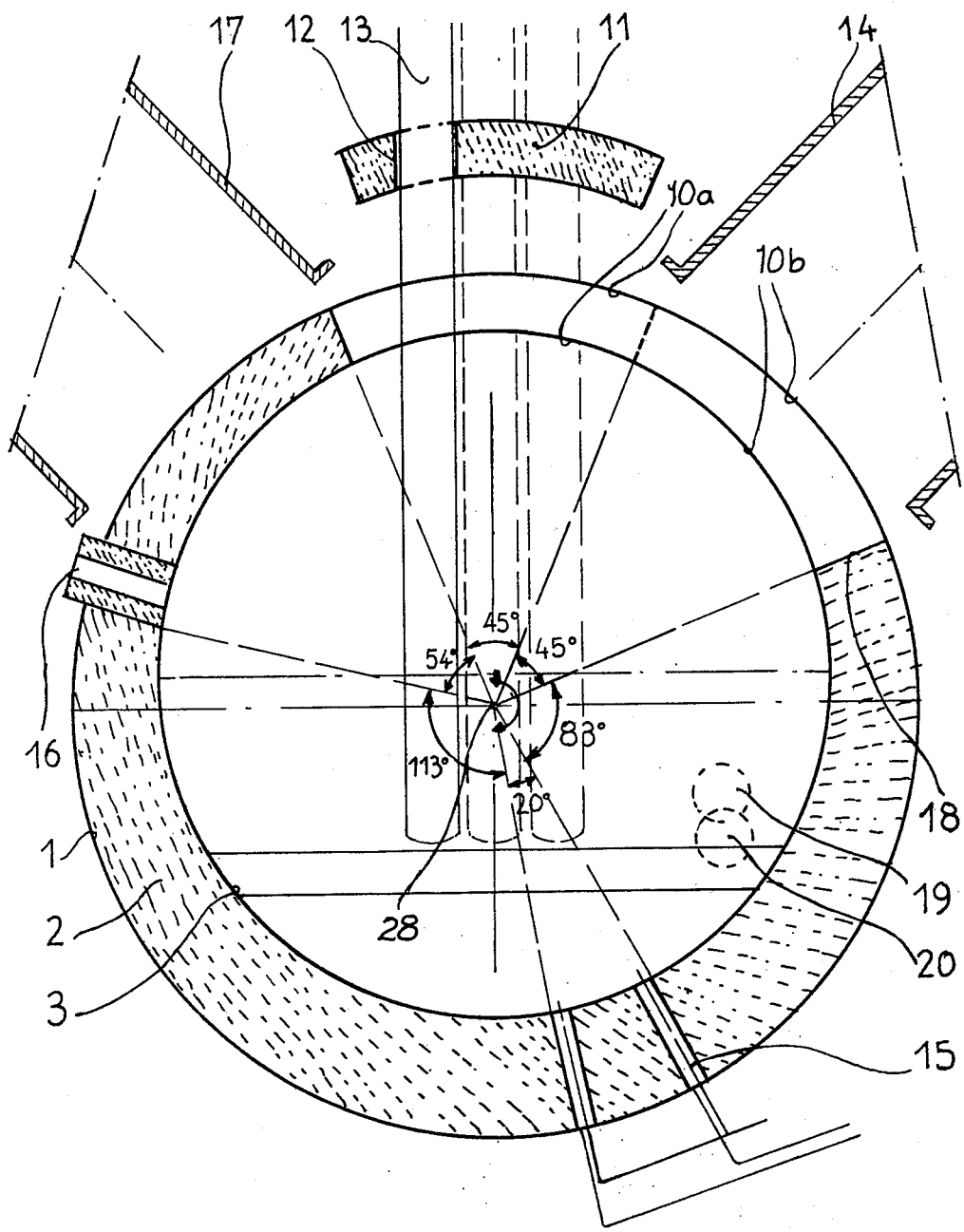
FIG. 1 is a vertical cross-section of an embodiment of a drum converter in accordance with the present example, taken through the plane of symmetry perpendicular to its horizontal axis of rotation and when the converter is occupying its operative or "normal" position for simultaneous heating, melting and refinement.

The converter shown in the drawings has a capacity of 140 tons of liquid steel, three threephase electrodes and ten blastpipes. The walls of the converter are formed of metal defining a cylinder 1 of 7.5 meters in diameter by 4.25 meters in length, and two domed end members of 7.50 meters in diameter with a bow of 2.10 meters, with the result that the overall length of the converter is 8.45 meters. The ratio between the length and the diameter is 8.45:7.50 = 1.13. The ratio preferably lies between 0.8 and 1.8 and advantageously between 1 and 1.3.

In FIG. 1 it may be seen that the metal cylinder 1 is lined inside with a refractory lining 2, the inner periphery 3 of which is a circle of 6 meters in diameter, slightly eccentric towards the top by about 25 centimeters, with the result that the thickness of the lining has a minimum at the top and a maximum at the bottom in the "normal" position of the converter. The minimum thickness is thus 50 centimeters and the maximum thickness is one meter.

In FIG. 4 it may be seen that the two domed end members consist of two spherical metal cups 4 and 5, lined inside with a varying thickness of refractory material 6 and 7 inwardly bounded by two other spherical cups 8 and 9. The maximum thickness of the refractory material is here likewise one meter.

The converter can be rotated about the axis of rotation 28.

The circumference of the cylinder 1 may be considered as divided into six successive unequal angular sectors, centered upon the axis 28.

Starting from the top in the "normal" position of the converter (FIG. 1), there is a first sector subtending an angle at the center equal to 45°, and a second sector, likewise subtending an angle of 45°. Both sectors include a wide elongated opening 10 which is a portion of a cylinder subtending an angle at the center equal to 90°. During the main operation of simultaneous heating, melting and refinement, the converter is in the position called "normal" shown in FIG. 1, and the first half 10a of the opening 10 of the first sector is occupied by a refractory arch 11 including three orifices 12 and a fourth orifice (not shown). Three threephase electrodes 13 extend through the three orifices 12, the electrodes constituting the means of heating the converter. The fourth orifice, not shown in the Figures, is used for admitting to the furnace the solid matter charged during the course of metallurgical operation. It is equally possible before the start of the operation to charge the converter with a basket of solid matter as in a traditional electric arc furnace through the wide elongated opening 10.

The second half 10b of the opening 10 of the second 45° sector, in the "normal" position, lies in front of a first device 14 for collection of the gases.

The third sector, subtending an angle at the center of 83° in the present embodiment, includes solely refractory lining without any opening.

The fourth sector, subtending an angle at the center of 20° includes two rows of blastpipes 15. In FIG. 4 it may be seen that each row includes 5 blastpipes spaced apart by 75 centimeters in the direction of the length of the converter. They are double blastpipes blowing in pure oxygen in the center and protected against wear by a peripheral protective agent. The depth of metal bath above the nozzles of the blastpipes is 75 centimeters for 140 tons of steel.

In FIG. 1 it is evident that the fifth sector, subtending an angle at the center of 113° includes, like the third, solely refractory lining without any opening.

Finally the sixth sector, subtending an angle of 54°, includes a refractory lining equipped with a taphole 16 arranged immediately adjacent the fifth sector, and this sixth sector is surmounted outside the zone of the taphole, by a second device 17 for collection of the gases, which is unused in the normal position of the converter.

Figure 2:
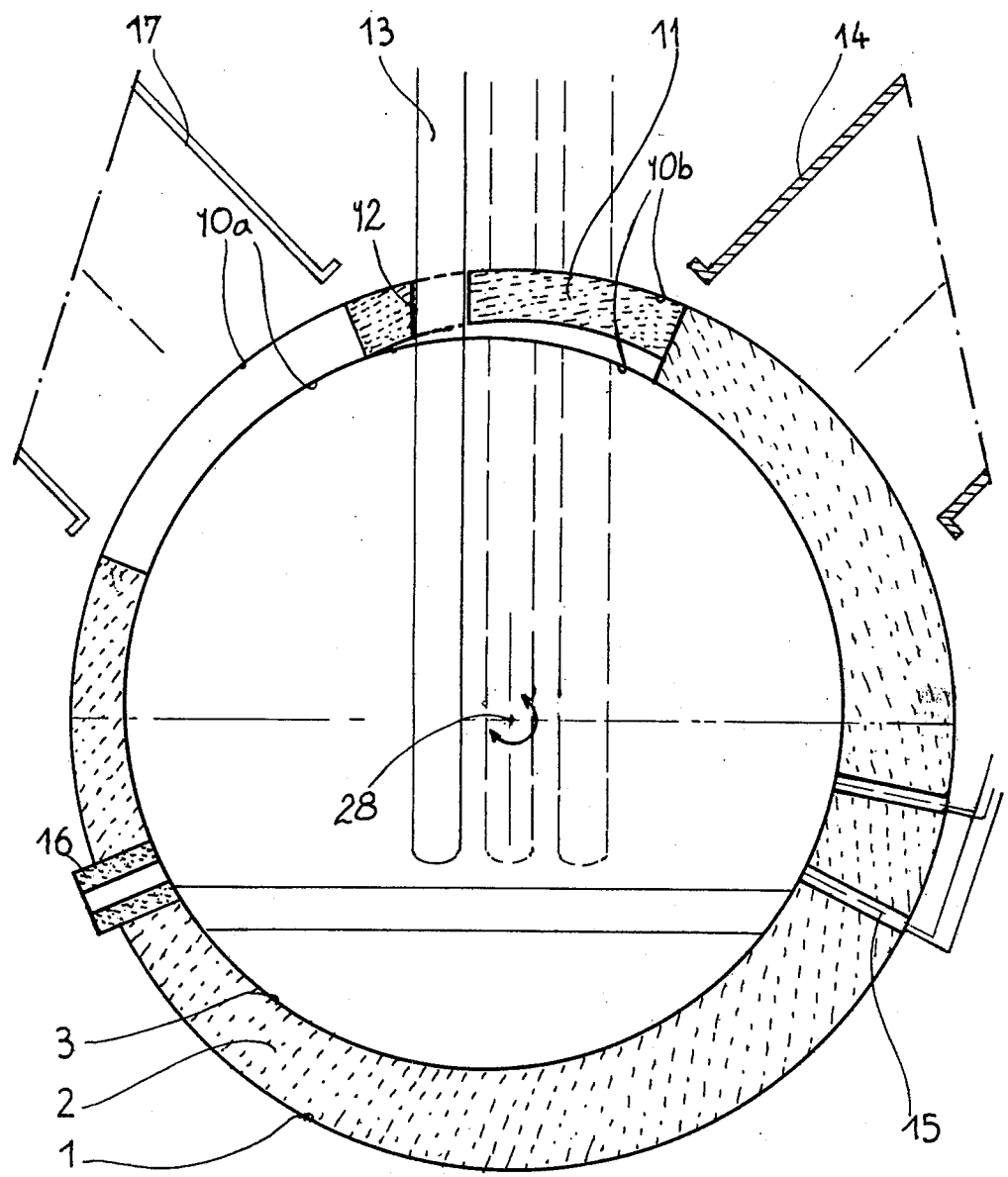
FIG. 2 is a similar cross-section through the converter of FIG. 1 when the converter has been turned counterclockwise by 45° with respect to the "normal" position, to occupy an operative position called "introduction of gradations" into the steel, in which heating means can be used and the blastpipes are above the surface of the metal charge.

The role of device 17 is evident from FIG. 2 which shows the converter after a counterclockwise rotation of the converter through 45°. The first half 10a of the elongated opening 10 is then located in front of the second collector device 17 while the second half 10b of this opening is covered by the movable refractory arch with the three electrodes 13. In the arrangement of FIG. 2, the converter has its blastpipes 15 above the surface and introduction of final gradations can be carried out with heating but without blasting.

Figure 3:
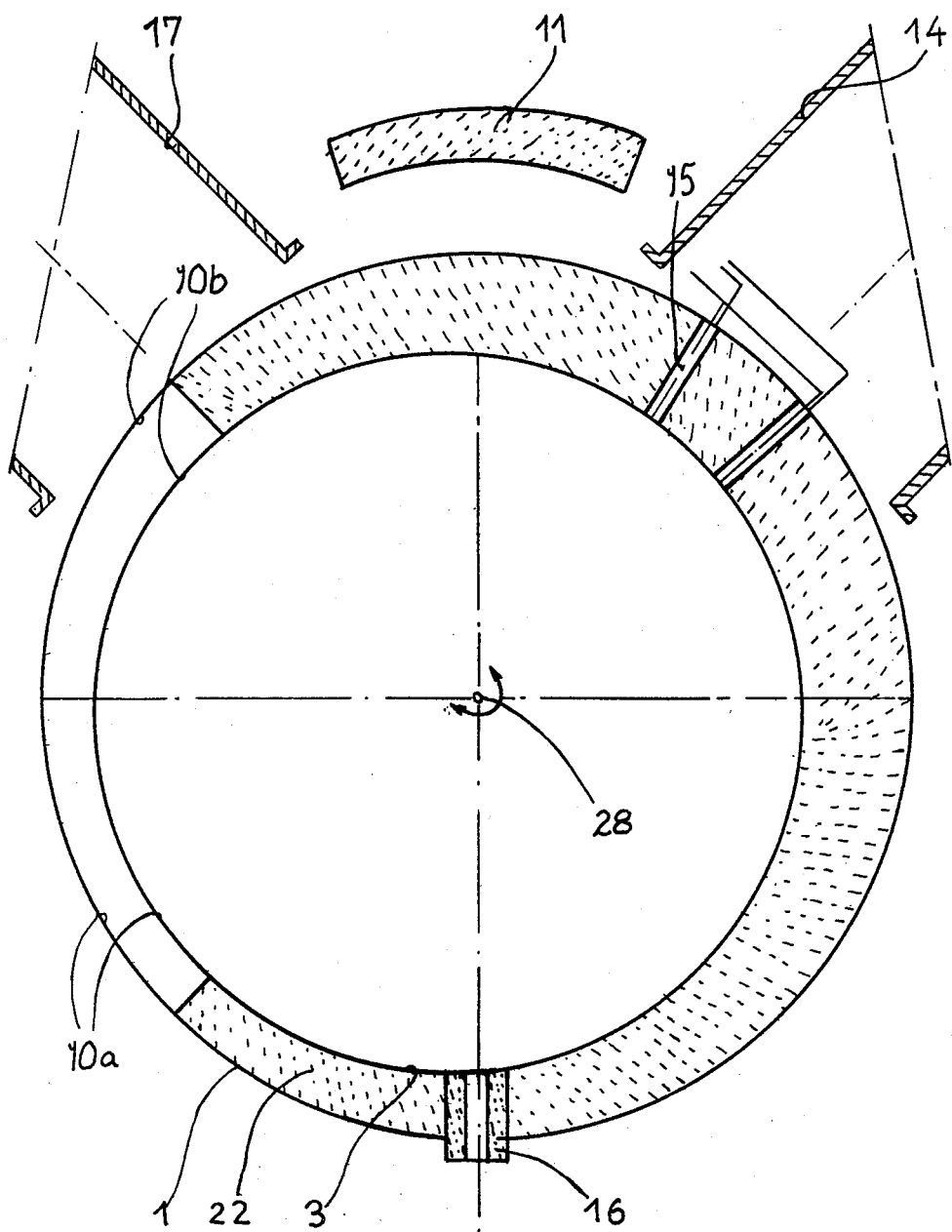
FIG. 3 is a similar cross-section through the converter of FIG. 1 when the converter has been turned counterclockwise by about 108° with respect to the "normal" position to occupy a position for tapping into a ladle, that is to say, with its taphole located at its lowest point.

FIG. 3 shows the converter in the position at the end of tapping into a ladle, after a rotation of about 108° from the "normal" position of FIG. 1, the taphole then coming to the lowest point.

Raking of slag may be carried out in two ways:
(a) by overflowing at the sill 18 (FIG. 1) which separates the second sector from the third, by a suitable rotation of the converter for pouring into a slag trough,
(b) or else by a channel 19-20 arranged in the thickness of the refractory 7 on the domed end member 5, which channel may be extended externally by a slagging channel (not shown) and discharging into a slag trough.

FIGS. 4 and 5 show diagrammatically the tilting mechanism.

The spherical metal cups 4 and 5 are attached to cradles 21 and 22 which roll on rollers 23. Rotation is effected by driving pinions 24. Alternatively, a metal belt or strap may be provided which extends horizontally about the converter body in the "normal" position thereof, the strap being fixed to the body and to trunnions supported on bearings for tilting of the converter body about its horizontal axis. A hollow trunnion 25 receives an oxygen pipe 26. The various flexible devices for feeding each blastpipe with protective agent are represented very diagrammatically at 27.

Of course, without departing from the scope of the invention as defined by the appendent claims, variants and improvements in detail may be conceived of, as well as the use of equivalent means envisaged.

Thus the cylindrical material 1 of the above described embodiment may be replaced by armouring in the form of a barrel or drum, that is to say, of circular cross-section decreasing from the center section out to the side sections. The corresponding refractory brickwork becomes slightly complicated, but the internal volume may thus exhibit an advantageous shape for good blastability and good behaviour of the refractory lining. While the openings 10a, 10b are described as being provided by a single opening 10, it will be appreciated that these openings 10a, 10b could be provided by adjacent but separate openings, one in each of the first and second sectors. The electrodes 13 may be replaced by other heating means, such as, a plasma torch or a fuel oil burner. The domed end member of the converter may be replaced by flat end members.

There is thus provided a converter with blowing-in through protected submerged blastpipes and provided with means for heating, which exhibits all the advantages of the blast power, of possibilities of tilting and the facilities for collection of the gases and for feeding the blastpipes, which are already found in traditional converters, but which also enables heating means to be employed during the course of refinement, with the possibility of submerging the blastpipes or letting them emerge at will, while preserving the use of the heating means.

It thus becomes possible to carry out simultaneously heating, melting and refinement of the charge during a first period during the course of which the (or more than one) heating means and the blastpipes operate together, with or without continuous charging with solid matter, then during a second period to proceed with additions for introducing gradations into the steel while continuing to employ the (or more than one) heating means but while then keeping the blastpipes above the surface by a suitable rotation of the converter.

Specifically, the main advantages of the above described converter are as follows:

(a) Means are available both for heating the electrodes, or a burner, or a plasma torch, and of refinement, the blastpipes.

(b) These means may be employed in conjunction or separately; in conjunction, when the converter is in the operative "normal" position and separately, in the following two cases:

(1) When the converter is still in the operative "normal" position, the blastpipes are submerged during the course of blowing in and the heating means are withdrawn, a complete arch being in place above the first sector. This is blasting without heating.

(2) When the converter is at 45° to the previous position, in the direction in which the blastpipes emerge above the surface of the bath, the heating means are in place and in operation, and gases are collected by the second collector device. This is heating without blasting, for example, for achieving, under satisfactory conditions, the introduction of final gradations into the steel being produced.

(c) Tilting of the converter runs through the whole circumference as with conventional steelworks converters and contrary to Martin furnaces and traditional electric arc furnaces.

(d) By its shape and by its collection of the gases, the converter enables blast powers to be achieved which are comparable to those of traditional converters, hence much higher than those of the lances and blastpipes which can be employed in Martin furnaces and in traditional electric arc furnaces.

(e) The joint use of heating means, of blastpipes and of charging with solid matter, associated with two operative positions, with the blastpipes submerged or with the blastpipes above the surface, gives the converter a flexibility of working and a power of adaptation to any metallurgical operation, which are absolutely astonishing.

What is claimed is:

1. A converter for the refinement of liquid metal comprising:

a generally cylindrical hollow body having a horizontal axis and opening means in the circumference thereof including first and second circumferentially spaced parts;

end members closing the ends of said body;

means for supporting and rotating said body about said axis;

a refractory arch including heating means;

means for removing said arch into said first part of said opening means when said opening means is in the upper part of said body, said heating means then extending into said body;

first means for collection of gases from said body, said first gas collection means being separate from said body and mounted to be aligned with said second part of said opening means to receive gases therethrough when said first part of said opening means is positioned to receive said arch and heating means;

blast pipe means extending through and into said body, said blast pipe means being arranged in a lower part of said body when said first part of said opening means is positioned to receive said arch and heating means; and second means for collection of gases from said body, said second gas collection means being separate from said body, said first and said second gas collection means being arranged symmetrically with respect to said arch such that on rotation of said body to position said arch in said second part of said opening means said second gas collection means is aligned with said first part of said opening means, said blast pipe means being then arranged in an emerged position above or at the surface of the bath of metal in the converter body.

2. A converter as claimed in claim 1, wherein said body and end members are made of sheet steel internally lined with refractory material.

3. A converter as claimed in claim 1, wherein said end members are outwardly domed.

4. A converter as claimed in claim 1, wherein said end members are generally planar.

5. A converter as claimed in claim 1, wherein said opening means is provided by a single opening.

6. A converter as claimed in claim 1, wherein said opening means is provided by two adjacent but angularly spaced openings each providing one of said parts of said opening means.

7. A converter as claimed in claim 1, wherein said heating means comprises one of the group formed by three threephase electrodes, a fuel-oil burner and a plasma torch.

8. A converter as claimed in claim 1, wherein said blast pipe means comprise a plurality of blast pipes each provided with means for admission of a peripheral protective agent for protection against wear during blowing in.

9. A converter as claimed in claim 1, wherein the ratio between the overall length of the converter body and its diameter lies between 0.8 and 1.8.

10. A converter as claimed in claim 9, wherein said ratio is between 1 and 1.3.

11. A converter as claimed in claim 1, wherein said supporting means includes two circular cradles for rolling on rollers.

12. A converter as claimed in claim 1, wherein said supporting means comprises a metal belt extending horizontally about said converter body in said normal operative position thereof, said belt being fixed to said body and to two trunnions arranged on said horizontal axis of rotation of said converter body opposite one another, said trunnions resting on two bearings so that said converter body can tilt with its belt and its trunnions about said horizontal axis.

13. A converter as claimed in claim 1, including a taphole arranged in a quadrant of the circumference of said body, said quadrant extending from an outer edge of said first part of said opening means away from said opening means.

14. A converter as claimed in claim 1, including an aperture for raking off slag arranged in one of said end members, said aperture communicating externally with a profiled slagging channel, said aperture and the profile of said channel being such that a small rotation of said converter is sufficient to avoid or to carry out at small or large flow the raking off of slag.

15. A converter as claimed in claim 1, wherein the circumference of said body includes six unequal angular sectors which in the normal operative position of said body serve for simultaneous heating, melting and refinement as follows: a first sector, subtending an angle at the center of said body of 45° and with a vertical upwardly directed bisector, and including said first part of said opening means and receiving said heating means and said refractory arch; adjacent to said first sector, a second sector subtending an angle at the center of 45° and including said second part of said opening means and surmounted by said first gas collection means; adjacent to said second sector, a third sector subtending an angle at the center of 83°, and without any opening; adjacent to said third sector, a fourth sector subtending an angle at the center of 20° and including said blast pipe means which extends along the major portion of the length of said body; adjacent to said fourth sector a fifth sector subtending an angle at the center of 113° and without any opening; and finally, between said fifth and first sectors, a sixth sector subtending an angle at the center of 54° including a taphole arranged immediately adjacent said fifth sector, said sixth sector being surmounted outside of the zone of said taphole by the second means for collection of gases from said body, said second gas collection means being unused in the normal operative position, but usable if said body rotates through 45° in the appropriate direction.

16. A converter as claimed in claim 1, including a charging device for charging said body with solid matter arranged above said arch and for communicating with an aperture provided in said arch.

* * * * *